United States Patent [19]

Ogawa et al.

[11] 4,395,466

[45] Jul. 26, 1983

[54] MAGNETIC RECORDING MEDIUM

[75] Inventors: Hiroshi Ogawa; Yasuo Tamai, both of Kanagawa, Japan

[73] Assignee: Fuji Photo Film Co., Ltd., Odawara, Japan

[21] Appl. No.: 265,492

[22] Filed: May 20, 1981

[30] Foreign Application Priority Data

May 21, 1980 [JP] Japan .................................. 55-67558

[51] Int. Cl.³ ............................................... G11B 5/70
[52] U.S. Cl. ................................. 428/695; 252/62.54; 360/134; 360/135; 360/136; 427/128; 428/900; 428/323
[58] Field of Search ........................ 428/695, 900, 323; 252/62.54; 427/128; 360/134, 135, 136

[56] References Cited

U.S. PATENT DOCUMENTS

| 3,029,157 | 4/1962 | Sutheim | 428/900 |
| 3,387,993 | 6/1968 | Flowers | 428/900 |
| 3,634,253 | 1/1972 | Akashi et al. | 428/900 |
| 3,704,152 | 11/1972 | Hartmann et al. | 428/900 |
| 3,993,824 | 11/1976 | Shirahata et al. | 428/900 |
| 4,188,301 | 2/1980 | Naruse et al. | 252/62.54 |
| 4,247,407 | 1/1981 | Naruse et al. | 252/62.54 |
| 4,275,115 | 6/1981 | Naruse | 428/694 |

Primary Examiner—Ellis P. Robinson
Attorney, Agent, or Firm—Sughrue, Mion, Zinn, Macpeak & Seas

[57] ABSTRACT

A magnetic recording medium comprising a non-magnetic base which has formed thereon a magnetic layer made of a binder and fine ferromagnetic particles dispersed therein is disclosed. The magnetic layer is characterized by containing a mineral oil having a viscosity of 300 cs or less at 37.8° C. and an aliphatic acid having 12 to 22 carbon atoms.

3 Claims, 2 Drawing Figures

MAGNETIC RECORDING MEDIUM

FIELD OF THE INVENTION

This invention relates to a magnetic recording medium, and more particularly to a magnetic recording medium having improved running property and durability.

BACKGROUND OF THE INVENTION

A magnetic recording medium, particularly audio cassette tape, which has recently found increasing utility in radio cassette tape recorder or car stereo must have a high running property and durability at elevated temperature and high humidity. A video cassette tape whose total thickness is 20 μm or less is common. Portable video tape recorders have come into wide use these days. The demand for VTR tape having a running property and durability far beyond those of the conventional tape is great. Needless to say, these audio and video tapes must have improved electromagnetic conversion characteristics such as sensitivity, frequency characteristics, and S/N ratio. Therefore, there exists a great demand for audio and video tapes having running property, durability and electromagnetic conversion characteristics much better than those achieved by the existing product. To meet this demand, several lubricants have been proposed to date, but none of them can meet the demand fully. Two known examples of the conventional lubricant are the combination of a mineral lube oil and aliphatic acid amide (U.S. Pat. No. 3,387,993) and a mineral oil having a melting point of 34° to 54° C. (U.S. Pat. No. 3,525,694). But even these lubricants are not able to provide a magnetic recording medium that meets the current requirement of high running property and durability.

SUMMARY OF THE INVENTION

Therefore, one object of this invention is to provide a novel magnetic recording medium.

Another object of the invention is provide a magnetic recording medium having improved running property and durability.

A further object of the invention is to provide a magnetic recording medium having improved electromagnetic conversion characteristics.

As a result of various studies to achieve these objects, we have found that magnetic tape having an improved running property and durability can be produced when both a mineral oil having a viscosity of 300 cs or less at 37.8° C. and an aliphatic acid having 12 to 22 carbon atoms are used as lubricant. Based on this finding, we have accomplished an invention which is described in detail hereunder.

The process of this invention can be applied to a preparation of any magnetic tapes such as an audio tape, a video tape and a computer tape, but not restricted to a preparation of a specific magnetic tape.

DETAILED DESCRIPTION OF THE INVENTION

Figure 1:
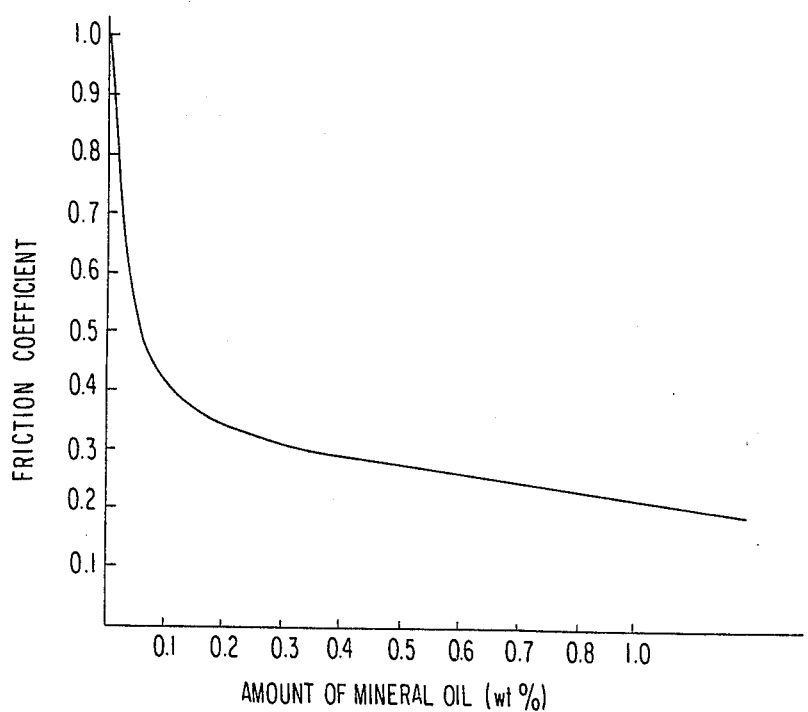
FIG. 1 is a graph showing the coefficient of friction of permalloy against audio cassette tape using both 1.0 wt% of an aliphatic acid (myristic acid) and a varying amount of mineral oil (turbine oil No. 4) as lubricant.
Figure 2:
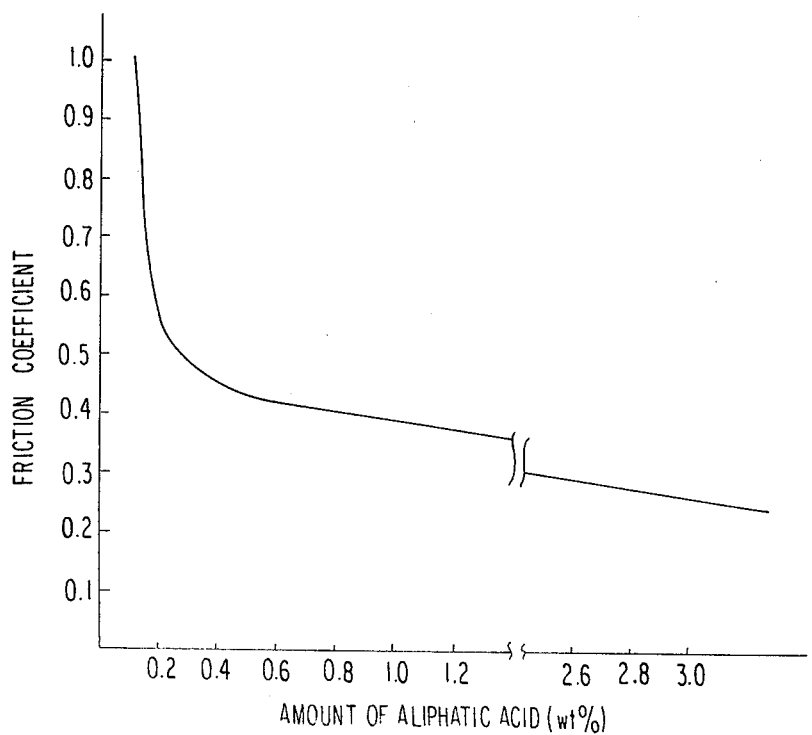
FIG. 2 is a graph showing the coefficient of friction of permalloy against audio cassette tape using both 0.2 wt% of a mineral oil (turbine oil No. 4) and a varying amount of aliphatic acid (myristic acid) as lubricant.

Examples of the mineral oil having a viscosity of 300 cs or less at 37.8° C. include spindle oil No. 1 and No. 2 described in JIS K2210-1963, refrigerating machine oil Nos. 1 to 3 described in JIS K2211-1963, turbine oil Nos. 1 to 4 described in JIS K2213-1961, gear oil, type 1, Nos. 1 to 4 and type 2, Nos. 1 to 4 described in JIS K2219-1967, and machine oil Nos. 1 to 3 described in JIS K2214-1959. If the viscosity of the mineral oils used in this invention is greater than 300 cs at 37.8° C., no appreciable increase in running property is achieved.

The mineral oil having a viscosity of 300 cs at 37.8° C. is contained in the magnetic layer in an amount of at least 0.05 wt%, preferably from 0.1 to 1.0 wt%, most preferably from 0.5 to 1.0 wt%, based on the weight of fine ferromagnetic powder. If the content of the mineral oil is less than 0.05 wt%, no improvement in running property and durability is achieved. The mineral oil used in an amount greater than 1 wt% will easily bloom to the surface of the magnetic layer.

Examples of the aliphatic acid used in this invention include saturated and unsaturated monobasic aliphatic acids having a branched carbon chain or straight carbon chain, preferably straight carbon chain, and it desirably has 12 to 22 carbon atoms. If the acid has less than 12 carbon atoms, no improvement in durability is achieved, and an aliphatic acid having more than 22 carbon atoms is usually hard to obtain, i.e., it will easily bloom to the surface of the magnetic layer and form the white powder thereto. The aliphatic acid having 12 to 22 carbon atoms is contained in the magnetic layer in an amount of at least 0.2 wt%, preferably from 0.5 to 3.0 wt%, most preferably from 2.0 to 3.0 wt%, based on the fine ferromagnetic powder. If the content of the aliphatic acid is less than 0.2 wt%, no improvement in running property or durability is attained, and if the content is greater than 3 wt%, especially greater than 5 wt%, a magnetic layer having low strength and hence low durability is produced.

These lubricants according to this invention are either incorporated in a magnetic paint or applied to a magnetic layer.

The magnetic recording medium of this invention essentially contains a fine ferromagnetic powder, binder, and the lubricants described above, and optionally it contains a dispersant such as amides of saturated or unsaturated monobasic aliphatic acids, alkylphosphates, lecithin, etc., an abrasive such as SiC, $Cr_2O_3$, $TiO_2$, $Al_2O_3$, etc., a carbon such as carbon powder having a diameter about 5 mμ to 200 mμ, etc. Examples of the fine ferromagnetic powder used in this invention are gamma (γ)-$Fe_2O_3$, co-modified iron oxide, and fine iron-base alloy powder, and the fine iron-base alloy powder is particularly preferred. A magnetic paint having the fine ferromagnetic powder and dispersant dispersed therein may be prepared and applied to a base in a manner known in the art, for example, by any of the methods described in Japanese patent application (OPI) Nos. 46011/79 and 21805/79 (the term "OPI") as used herein means an unexamined published Japanese patent application), and U.S. Pat. No. 4,135,016.

This invention is now described in greater detail by reference to the following examples and comparative examples which are given here for illustrative purposes only and are by no means intended to limit the scope of the invention. In the examples and comparative examples, all parts are by weight.

EXAMPLE 1

A composition of the formula indicated below was kneaded in a ball mill for 24 hours, and the mixture was passed through a filter having an average pore size of 3 μm to prepare a magnetic paint.

| | |
|---|---|
| Gamma-Fe$_2$O$_3$ (Hc = 400 Oe, major to minor axis ratio/(acicular ratio) = 10:1, av. particle length = 0.4 μm) | 100 parts |
| Vinyl chloride/vinyl acetate/vinyl alcohol copolymer (92:3:5, degree of polymerization = 420) | 16 parts |
| Polyester polyurethane (m.w. = ca. 130,000) | 4 parts |
| Aliphatic acid (for the type and amount; see Table 1) | |
| Mineral oil (for the type and amount, see Table 1) | |
| Methyl ethyl ketone | 200 parts |
| Cyclohexanone | 100 parts |

The magnetic paint was applied onto a polyethylene terephthalate film having 7 μm thick with a reverse roll to give a dry thickness of 5 μm, and while the coating was still wet, the film was passed under an electromagnet (1000 gauss) to orient the magnetic particles, and dried. The dried film was super-calendered to provide a smooth magnetic layer. The resulting film roll was slit into six audio cassette tape samples (Phillips type) of 3.81 mm wide. The characteristics of the samples are shown in Table 1 below.

COMPARATIVE EXAMPLE 1

Three tape samples (C-1, C-2 and C-3) were prepared by repeating the procedure of Example 1. Sample C-1 was prepared without using a mineral oil. Sample C-2 was prepared without using an aliphatic acid. Sample C-3 was prepared using an aliphatic acid made (for the type and amount, see Table 1) instead of aliphatic acid. The characteristics of the comparative samples are also shown in Table 1.

EXAMPLE 2

A composition of the formulation indicated below was kneaded in a ball mill for 24 hours, mixed with 5 parts (by solid content) of a polyisocyanate compound ("Desmodur L75" of Bayer Co., Ltd.), and kneaded for another one hour. The resulting mixture was passed through a filter having an average pore size of 1 μm to provide a magnetic paint.

| | |
|---|---|
| Co-coated Berthollide iron oxide (FeO$_{1.4}$ coated with 2.0 atomic % Co Hc = 660 Oe, major to minor axis ratio (acicular ratio) = 10/1, average particle length = 0.5 μm) | 100 parts |
| Vinyl chloride/vinyl acetate/maleic anhydride copolymer (86:13:1, degree of polymerization = 430) | 12.5 parts |
| Polyester polyurethane (m.w. = ca. 130,000) | 7.5 parts |
| Carbon powder (particle size = ca. 10 m μ) | 1 part |
| Alumina powder (av. particle size = 0.5 μm) | 2 parts |
| Aliphatic acid (for the type and amount, see Table 2) | |
| Methyl ethyl ketone | 200 parts |
| Cyclohexanone | 100 parts |

The magnetic paint was applied onto a polyethylene terephthalate having film 14 μm thick with a reverse roll to give a dry thickness of 5 μm, and while the coating was still wet, the film was passed under an electromagnet (3000 gauss) to orient the magnetic particles, and dried. The dried film was sprayed with a mineral oil (for the type and amount, see Table 2) dissolved in n-hexane at a concentration of 10 wt%, and dried. The film was then super-calendered to provide a smooth magnetic layer. The resulting film roll was slit into six video cassette tape samples (VHS type) of ½ inch wide. The characteristics of the samples are shown in Table 2 below.

COMPARATIVE EXAMPLE 2

Three tape samples (C-4, C-5 and C-6) were prepared by repeating the procedure of Example 2. Sample C-4 was prepared without using a mineral oil; Sample C-5 was prepared without using an aliphatic acid; and sam-

TABLE 1

| Sample No. | Aliphatic acid Type | Aliphatic acid Amount (parts) | Mineral oil Type | Mineral oil Amount (parts) | Audio tape running property | Audio tape durability | Audio output | Frequency characteristics |
|---|---|---|---|---|---|---|---|---|
| Example 1 | | | | | | | | |
| 1 | Oleic acid | 1.0 | Spindle oil No. 1 | 0.2 | A | A | 1.5 | 3.0 |
| 2 | Oleic acid | 1.0 | Turbine oil No. 4 | 0.2 | A | A | 1.4 | 3.1 |
| 3 | Oleic acid | 1.0 | Gear oil, type 1, No. 4 | 0.2 | A | A | 1.5 | 2.8 |
| 4 | Myristic acid | 1.0 | Spindle oil No. 1 | 0.2 | A | A | 1.6 | 3.4 |
| 5 | Myristic acid | 1.0 | Turbine oil No. 4 | 0.2 | A | A | 1.6 | 3.2 |
| 6 | Myristic acid | 1.0 | Gear oil, type 1, No. 4 | 0.2 | A | A | 1.5 | 3.0 |
| Comp. Example 1 | | | | | | | | |
| C-1 | Oleic acid | 1.0 | — | — | C | C | 1.3 | 2.8 |
| C-2 | — | — | Spindle oil No. 1 | 0.2 | B | C | 1.2 | 1.9 |
| C-3 | Oleinamide | 1.0 | Spindle oil No. 1 | 0.2 | B | B | 0.8 | 1.1 | ple C-6 was prepared using an aliphatic acid amide (for the type and amount, see Table 2) instead of aliphatic acid. The characteristics of the comparative samples are also shown in Table 2.

TABLE 2

| Sample No. | Aliphatic acid Type | Amount (parts) | Mineral oil Type | Amount (parts) | Video tape running property | Video tape durability | Video output (dB) | S/N ratio (dB) |
|---|---|---|---|---|---|---|---|---|
| Example 2 | | | | | | | | |
| 7 | Oleic acid | 1.5 | Spindle oil No. 1 | 0.1 | A | A | 1.0 | 52 |
| 8 | Oleic acid | 1.0 | Turbine oil No. 4 | 0.1 | A | A | 1.2 | 52 |
| 9 | Oleic acid | 1.5 | Gear oil, type 1, No. 4 | 0.1 | A | A | 1.2 | 53 |
| 10 | Myristic acid | 1.5 | Spindle oil No. 1 | 0.1 | A | A | 1.3 | 53 |
| 11 | Myristic acid | 1.5 | Turbine oil No. 4 | 0.1 | A | A | 1.4 | 53 |
| 12 | Myristic acid | 1.5 | Gear oil, type 1, No. 4 | 0.1 | A | A | 1.4 | 54 |
| Comp. Example 2 | | | | | | | | |
| C-4 | Oleic acid | 1.0 | — | — | C | B | 1.0 | 51 |
| C-5 | — | — | Spindle oil No. 1 | 0.1 | D | D | −2.4 | 48 |
| C-6 | Oleinamide | 1.0 | Spindle oil No. 1 | 0.1 | B | B | −0.9 | 49 |

EXAMPLE 3

Two more video cassette tape sample were prepared by repeating the procedure of Example 2 except that the Co-coated Berthollide iron oxide was replaced by fine Fe-Ni alloy powder (Fe to ni weight ratio=90:10, Hc=1300 Oe, major to minor axis ratio (acicular ratio)=10:1, av. particle length=0.4 μm). The characteristics of the samples are shown in Table 3 below.

COMPARATIVE EXAMPLE 3

Three tape samples (C-7, C-8 and C-9) were prepared by repeating the procedure of Example 3. Sample C-7 was prepared without using a mineral oil; Sample C-8 was prepared without using an aliphatic acid; and Sample C-9 was prepared using an aliphatic acid amide (for the type and amount, see Table 3) instead of aliphatic acid. The characteristics of the comparative samples are also shown in Table 3.

(a) Audio tape running property: Each sample was run in 20 commercial cassette tape deck units and checked to see if it could be wound orderly. Evaluation was made on the following basis.

A . . . could be wound orderly
B . . . could not be wound orderly on 1 to 5 deck units
C . . . could not be wound orderly on 5 to 10 deck units (b) Audio tape durability: Each sample was run to see if any tape squeal was heard. Evaluation was made on the following basis.

A . . . No squeal was heard
B . . . Short squeals were heard during one to two passes
C . . . Squeals were heard after three passes (C) Audio output: The output at 315 Hz in comparison with the output of reference tape which was assumed to be 0 dB was measured (ref. tape: QP-12 of BASF A.G.) with Model 582 of Nakamichi K.K.

(d) Frequency characteristics: Frequency characteristics was determined by subtracting the output at 315 Hz from that at 10 KHz.

The characteristics of the tape samples prepared in

TABLE 3

| Sample No. | Aliphatic acid Type | Amount (parts) | Mineral oil Type | Amount (parts) | Video tape running property | Video tape durability | Video output (dB) | S/N ratio (dB) |
|---|---|---|---|---|---|---|---|---|
| Example 3 | | | | | | | | |
| 13 | Oleic acid | 2.0 | Turbine oil No. 4 | 0.1 | A | A | 8.0 | 50 |
| 14 | Myristic acid | 2.0 | Turbine oil No. 4 | 0.1 | A | A | 8.7 | 51 |
| Comp. Example 3 | | | | | | | | |
| C-7 | Myristic acid | 2.0 | — | — | B | C | 7.0 | 50 |
| C-8 | — | — | Turbine oil No. 4 | 0.1 | D | D | 3.5 | 46 |
| C-9 | Oleinamide | 2.0 | Turbine oil No. 4 | 0.1 | B | B | 7.4 | 51 |

The characteristics of the tape samples prepared in Example 1 and Comparative Example 1 were determined by the procedure described below.

Examples 2 and 3 as well as in Comparative Examples 2 and 3 were determined by the procedure described below.

(e) Video tape running property: Each sample was run in 20 commercial video cassette deck units (VHS type) and checked to see if any jitter or skew occurred. Evaluation was made on the following basis.
A ... No jitter or skew occurred
B ... Occasional jitters and skewing caused no serious problem
C ... Occasional jitters and skewing produced an undesired picture
D ... The picture wobbled and was not worth viewing.

(f) Video tape durability: Each tape was subjected to repeated running, and the resulting increase in the number of dropouts and the degree of jitter or skew were checked. Evaluation was made on the following basis.
A ... No problem at all
B ... Some but negligible problem
C ... Some problem that could not be overlooked
D ... Terrible (g) Video output: The output at 4 MHz in comparison with the output of a reference tape which was assumed to be 0 dB was measured (ref. tape: VHS tape of Fuji Photo Film Co., Ltd.) with Model NV-6600 of Matsushita Electric Industrial Co., Ltd.

(h) S/N ratio: The S/N ratio for a frequency range of 10 KHz to 4 MHz after subjective correction was measured with Model NV-6600 of Matsushita Electric Industrial Co., Ltd.

The data in Tables 1 to 3 shows that a lubricant made of a mineral oil and aliphatic acid combined according to this invention provides audio cassette tape and video cassette tape whose running property, durability, as well as better electromagnetic conversion characteristics such as output, frequency characteristics and S/N ratio are better than those of the audio and video cassette tapes prepared by using either mineral oil or aliphatic acid alone or by combining a mineral oil with aliphatic acid amide.

While the invention has been described in detail and with reference to specific embodiments thereof, it will be apparent to one skilled in the art that various changes and modifications can be made therein without departing from the spirit and scope thereof.

What is claimed is:
1. A magnetic recording medium, comprising:
a non-magnetic base;
a magnetic layer formed on said base; said magnetic layer consisting essentially of a binder and fine ferromagnetic particles dispersed within said binder, a mineral oil having a viscosity of 300 cs or less at 37.8° C. contained in said magnetic layer an an amount of 0.05 weight percent to 1 weight percent, and an aliphatic acid having 12 to 22 carbon atoms contained in said magnetic layer in an amount of about 0.2 weight percent to 5.0 weight percent, based on the weight of the fine ferromagnetic powder.

2. A magnetic recording medium as claimed in claim 1 wherein said mineral oil is contained in said magnetic layer in an amount of between 0.1 weight percent to 1.0 weight percent based on the weight of the fine ferromagnetic powder, and said aliphatic acid is contained within said magnetic layer in an amount of between 0.5 weight percent to 3.0 weight percent.

3. A magnetic recording medium as claimed in claim 1, further comprising a dispersant, an abrasive, and carbon.

* * * * *